United States Patent [19]

Östbo

[11] 4,020,971

[45] May 3, 1977

[54] METHOD OF AND ARRANGEMENT FOR SEALING THE JOINTS BETWEEN THE PARTS OF A MULTI-PART HOUSING

[76] Inventor: John David Bertil Östbo, Byvagen 84-86, S-151 52 Sodertalje, Sweden

[22] Filed: Apr. 18, 1975

[21] Appl. No.: 569,438

[30] Foreign Application Priority Data

Apr. 19, 1974 Sweden .............................. 7405332

[52] U.S. Cl. .............................. 220/378; 220/5 A; 277/236; 228/175; 228/140
[51] Int. Cl.² ......................................... F16J 15/08
[58] Field of Search .......... 228/175, 176, 263, 140; 277/1, 53, 235 R, 235 A, 236; 52/758 J; 220/5 A, 378

[56] References Cited

UNITED STATES PATENTS

| | | | |
|---|---|---|---|
| 2,147,407 | 2/1939 | Huston et al. | 228/263 X |
| 3,893,505 | 7/1975 | Fujikake et al. | 277/96 R |

*Primary Examiner*—Al Lawrence Smith
*Assistant Examiner*—K. J. Ramsey
*Attorney, Agent, or Firm*—Fred Philpitt

[57] ABSTRACT

Means for use in sealing the joints between the parts of a multi-part housing, for example a two-part turbine housing, pump housing or the like. Said means comprises a rail of a material of the same type as that of the housing parts to be sealed and a strip of a higher-grade material than that of said rail disposed on the rail. Said rail with the strip of said higher-grade material being adapted to be disposed in a groove in the surfaces of the housing parts to be sealed.

10 Claims, 4 Drawing Figures

METHOD OF AND ARRANGEMENT FOR SEALING THE JOINTS BETWEEN THE PARTS OF A MULTI-PART HOUSING

This invention relates to a method of and a means for sealing the joints between the various parts of a multi-part housing, for example a two-part turbine housing, pump housing or the like. The invention relates especially to such seals in which a material is applied to the surfaces of the housing parts to be sealed which material is of a higher grade than the material of the housing parts and, inter alia, more resistant to erosion.

In sealing the joints between, for example, carbon steel housing parts, for example for steam turbines and hot-water pumps, it has been found necessary to provide the seal between the various housing parts by means of strips of a higher-grade material, e.g. chrome steel, disposed on the opposite surfaces of said parts. The method most frequently used heretofore for applying the higher-grade material to the casing parts has been by welding, more specifically deposit welding. However, this gives rise to considerable problems in connection with cracking of both the base material and the deposited material. Moreover, where this method is used it is very difficult to discover cracks. Another risk is that micro-cracks which are tolerable during manufacture will increase in size during operation and thus endanger the operational safety of the apparatus. The methods of applying the high-grade material as used heretofore make any repairs extremely expensive and time-consuming.

The main object of the invention is to provide a method of and a means for sealing between housing parts as specified hereinbefore which result in that the said disadvantages are eliminated or greatly reduced.

To this end, the invention is characterised in that strips of the higher-grade material are applied to rails of a material of the same type as that of the housing parts, and in that said rails are applied to the opposite surfaces of the housing parts which are to be sealed.

Advantageously, the rails bearing the higher-grade sealing material are disposed in grooves formed in said opposite surfaces of the housing parts. The sealing material can be applied to the rails by forge welding, deposit welding or any other technique giving a reliable connection between the two materials. The said rails with the sealing material can, for example, be obtained by separating suitably shaped bars from compound sheets containing the required material combinations.

The use of rails allows very much simpler and more reliable inspection, for example as regards cracks, by means of non-destructive methods, such as X-ray examination or the like, than has been possible heretofore, since the rails with the additional material can be inspected from both sides. Further, welding of a foreign material to the material of the housing parts themselves is avoided. The invention also allows simpler examination to determine the extent of any cracking by destructive methods, e.g. microscopy and the like, since it is a simple matter to cut sections through both the sealing material and the material of the said rails. If any faults are found - and with the invention this is possible both before or on fixing the rails in the said grooves — these can be repaired relatively easily, for example by exchanging complete rails with the sealing material.

As already stated, the rails are advantageously placed in grooves in opposite surfaces of the housing parts and can be secured by tight welding on both sides along the entire length. In some applications, however, brazing may be preferable. They may also be secured by screws to prevent the rails from warping. It is a simple matter to weld such a rail, firstly because the two materials to be welded are of the same type and secondly because the weld can be carried out in the most suitable manner. Another great advantage of the invention is that the said rails with sealing material can be prefabricated on a large scale whereas applying the sealing material by known methods by welding directly to the housing parts have to be carried out manually, requiring great skill to achieve acceptable results.

The invention will be described in detail hereinafter with reference to the embodiments illustrated in the accompanying drawing wherein.

Figure 4:
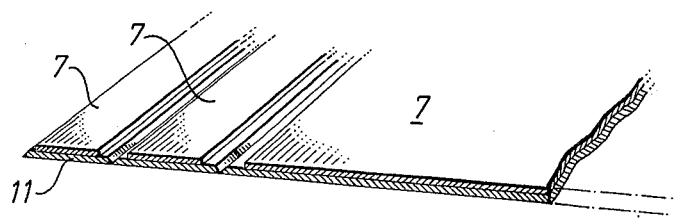

FIG. 4 diagrammatically shows a method of obtaining a sealing means according to the invention.

Figure 1:
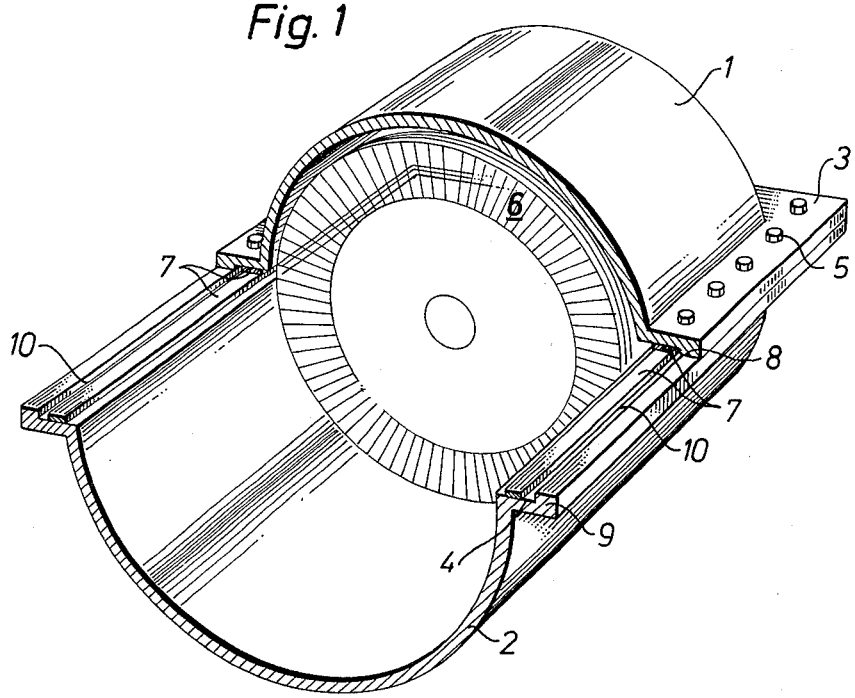
FIG. 1 is a diagrammatic perspective view of a two-part turbine housing, partly in section.

FIG. 1 shows a turbine housing comprising a top part 1 and a bottom part 2 provided with connecting flanges 3 and 4 respectively. The flanges are pressed into sealing-tight contact by bolts 5. The two housing parts 1 and 2 are intended hermetically to enclose a steam turbine 6 shown only diagrammatically.

To satisfy the very high requirements put on the seal and sealing material between the two housing parts 1 and 2, a strip 7 of a higher-grade material than the turbine housing is disposed on the flanges 3 and 4 respectively so that when the housing is assembled the strips 7 disposed on opposite flange surfaces are pressed in sealing-tight contact against one another. If, for example, the turbine housing material is an ordinary carbon steel, the material of the said strip 7 may be chrome steel. In the way described a completely reliable seal for the transition between the housing parts 1 and 2 is obtained. As will be apparent from FIG. 1, an outer part 8, 9 respectively of the flanges 3, 4 is made with a greater material thickness than the flanges otherwise which results in that these flange parts will also be in contact with one another when the housing is joined by means of the bolts 5. A duct 10 is formed in the flange connection between the strips of material 7 and the said outer flange parts 8, 9 which duct can be utilised as a safety evacuation duct.

Figure 2:
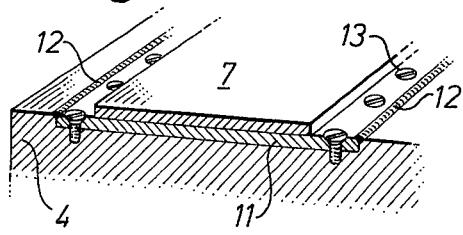
FIGS. 2 and 3 show parts of the flanges of a turbine housing according to FIG. 1 in section on which flanges a higher-grade sealing material has been applied according to the invention.
Figure 3:
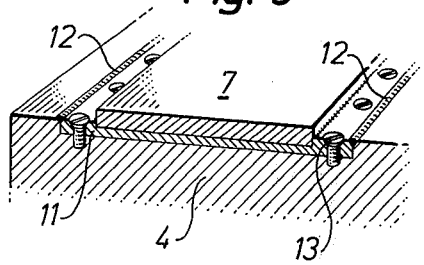

FIGS. 2 and 3 show two methods of applying a strip 7 of higher-grade material to a turbine housing flange 4 according to the invention, only part of the flange being shown. The common feature of these methods is that the strip 7 of sealing material is applied to a rail 11 of a material of the same type as the turbine housing flange 4. The rail 11 together with the sealing material 7 is then disposed in a groove advantageously so constructed in the flange 4 that the top part of the rail 11 is situated flush with the top of the flange 4. The groove for the rail 11 in the flange is also so constructed as, for example, to allow easy welding of the rail by means of longitudinal sealing-tight weld seams 12. The welding of the rail 11 in the flange 4 is very easy technically since the two materials to be welded together here are of the same type. Nor will these weld seams subsequently be subjected to any appreciable stresses. To ensure that the rail 11 cannot bend up, it can also be secured by screws 13 in the flange. If the actual strip 7 is itself constructed with an evacuation duct as shown in FIG. 1, screws 13 can also be disposed, for example, along a centreline of the rail 11. This construction is not shown in the drawing.

A number of methods are possible for fitting into the rail 11 the strip 7 of higher-grade material than the material of said rail 11 since the same can be carried out in separate operation.

FIG. 2 is intended to illustrate a case in which the strip 7 has been applied to the rail 11 by forge welding or in which the rail with the sealing material is separated like a bar from a compound sheet containing the required material combination. In both these cases, the joint between the strip 7 and the rail 11 is very reliable and of uniform quality.

FIG. 3 relates to a case in which the strip 7 of higher-grade material is applied to the rail 11 by deposit welding. For this purpose the rail has also been provided with a relatively shallow groove since this allows the boundary zone between the higher-grade material and the material of the rail 11, which zone contains a mixture of these materials, to be situated beneath the top surface of the remaining part of the rail 11 and flange 4. This means that part of the strip 7 which projects above the flange will only contain the said higher-grade material. Since the welding operation can be carried out on a loose rail, it can be carried out in quantities under accurately controlled conditions.

FIG. 4 shows how rails 11 with strips 7 of a higher-grade material can be cut from relatively large compound sheets containing a layer of material required in the rail 11 and a layer of higher-grade material required in the strip 7 and disposed on the first-mentioned layer. In these conditions, the material 7 is first milled away along parallel lines spaced by an amount corresponding to the width of the required strip 7, whereupon the cut is made through the layer 11 to divide the same into strips corresponding to the width of the rails 11.

Although the invention has been described above with reference to two-part steam turbine housing, it can of course also be used for other apparatuses in which the seal between two opposite surfaces has to satisfy stringent requirements. The method of applying the higher-grade material to the rail can be selected at will provided that the requirements in respect of the strength of the connection are satisfied. If it should prove suitable in some cases, the rails may be applied to the flanges in a first stage and the higher-grade material be applied to the rails in a second stage. It has been indicated hereinbefore that the rails can be secured in the grooves in the flanges by welding or brazing. Where the material used is difficult to weld or braze, it is also possible simply to use a screw connection, special sealing means advantageously being used for sealing the transition between the rails and the grooves in the flanges.

I claim:
1. In the known multi-part housing which is characterized by:
    a first housing,
    a second housing,
    said first and second housing being made of the same metallic material,
    a first portion of said first housing and a second portion of said second housing being disposed in essentially parallel relationship with each other,
    a first strip of a second metallic material connected to said first portion of said first housing and a second strip of the same second metallic material being connected to said second portion of said second housing,
    said second metallic material having erosion properties that are superior to those of the metallic material that makes up said first and second housings,
    said first and second strips of said second metallic material being pressed into sealing-tight contact with each other,
    the improvement which comprises
    said first and second strips of said second metallic material each being supported by and joined to separate rail members that each consist of a strip of material having the same metallic composition as said first and second housings,
    one of said rail members being fixed in a groove formed in said first portion of said first housing, and
    the other of said rail members being fixed in a groove formed in said second portion of said second housing,
    each of said rail members being wider than the strip of said second metallic material which each of said rail members supports.

2. An apparatus according to claim 1 wherein said strips of said second metallic material are joined to their respective rail members by forge welding.

3. An apparatus according to claim 1 wherein said strips of said second metallic material are joined to their respective rail members by deposit welding.

4. An apparatus according to claim 1 wherein the second metallic material is chrome steel.

5. In the known method of effecting a seal between two opposed surfaces of a multi-part housing, said opposed surfaces consisting of a first metal, which method comprises applying to each of said opposed surfaces a strip of a second metal having erosion properties which are superior to those of said first metal, the improvement which comprises supporting each strip of said second metal on a rail member composed of said first metal, and fastening each said rail member directly to a groove in an opposing surface, so that there is no direct contact between said opposing surfaces, each of said rail members being wider than the strip of said second metal which each of said rail members support.

6. A method according to claim 5, wherein the said rail members are disposed in grooves formed in each of said opposed surfaces, and the rail members are welded or brazed in said grooves in such a manner that the joints between the two longitudinal sides of the rail members and the opposed surfaces of the multi-part housing are completely sealed.

7. A method according to claim 5, wherein said strips of second material are applied to the said rail members by forge welding.

8. A method according to claim 5, wherein said strips of second metal are applied to the rail members by deposit welding.

9. A method according to claim 5, wherein said rail members with the strips of said second metal affixed thereto are obtained by separating the same from a large compound sheet having the required combination of materials.

10. A method according to claim 5, wherein said first metal consists of carbon steel and said second metal consists of chrome steel.

* * * * *